United States Patent
Hoshika

(10) Patent No.: US 8,327,366 B2
(45) Date of Patent: Dec. 4, 2012

(54) DATA PROCESSING DEVICE, SCHEDULING DEVICE, AND SCHEDULING METHOD FOR PROGRAM OPERATION CYCLE ALLOCATION

(75) Inventor: Kazuyuki Hoshika, Tokyo (JP)

(73) Assignee: Azbil Corporation, Tokyo (JP)

( * ) Notice: Subject to any disclaimer, the term of this patent is extended or adjusted under 35 U.S.C. 154(b) by 388 days.

(21) Appl. No.: 12/649,138

(22) Filed: Dec. 29, 2009

(65) Prior Publication Data

US 2010/0175069 A1      Jul. 8, 2010

(30) Foreign Application Priority Data

Jan. 7, 2009   (JP) .................................. 2009-001375

(51) Int. Cl.
   *G06F 9/46*    (2006.01)
(52) U.S. Cl. ...................................................... 718/102
(58) Field of Classification Search .................. None
   See application file for complete search history.

(56) References Cited

U.S. PATENT DOCUMENTS

| | | | |
|---|---|---|---|
| 7,165,252 B1* | 1/2007 | Xu ................................. | 718/102 |
| 2002/0103847 A1* | 8/2002 | Potash ........................... | 709/107 |
| 2009/0031319 A1* | 1/2009 | Fecioru .......................... | 718/103 |

FOREIGN PATENT DOCUMENTS

| | | |
|---|---|---|
| JP | 2002-351509 A | 12/2002 |
| WO | WO-2007/104330 A1 | 9/2007 |

* cited by examiner

*Primary Examiner* — Emerson Puente
*Assistant Examiner* — Gregory Kessler
(74) *Attorney, Agent, or Firm* — Troutman Sanders LLP

(57) ABSTRACT

The present invention comprises: a unit time calculating unit for calculating, as a unit time, the greatest common denominator of the individual operating cycles of a plurality of programs; an allocating unit for allocating the individual operating cycles of the plurality of programs into each of a plurality of continuous base periods that each have their respective unit times, in sequence beginning with the shortest operating cycle, and for allocating the operating cycles of remaining programs for which the operations have not been completed during one of the plurality of base periods into remaining base periods, in sequence beginning with the shortest operating cycles; and an operating unit for running the plurality of programs that are allocated to operating times.

9 Claims, 16 Drawing Sheets

DATA PROCESSING DEVICE, SCHEDULING DEVICE, AND SCHEDULING METHOD FOR PROGRAM OPERATION CYCLE ALLOCATION

CROSS-REFERENCE TO RELATED APPLICATION

The present application claims priority from Japanese Patent Application No. 2009-001375, filed on Jan. 7, 2009, and is hereby incorporated by reference in its entirety herein.

FIELD OF THE INVENTION

The present invention relates to computer technology, and relates to a data processing device, a scheduler, and a scheduling method.

BACKGROUND OF THE INVENTION

Digital controllers, such as process control units and PLCs (Programmable Logic Controllers), and the like are used for performing control processes in a discrete manner. Because of this, digital controllers repeat the operations of the programs by which to achieve the control operations at specific operating cycles. An example of this is disclosed in Japanese Unexamined Patent Application Publication 2002-351509, which is hereby incorporated by reference in its entirety. Increased levels of integration in microprocessors in recent years has led to increased speed in the processing capability of the microprocessors and compressed operating cycles. However, on the other hand, thought has also been given to the allocation, to each program, of the appropriate operating cycle, ranging from a short operating cycle to a long operating cycle, depending on the control process.

Conventionally, multiple programs having different operating cycles have been executed by multitasking operating systems (OS). However, simple time-sharing through a multitasking operating system cannot guarantee observance of the strict operating cycles of programs. Furthermore, it has been necessary to have complex procedures for assigning priority levels to each of the plurality of programs. In addition, thought has also been given to allocating the microprocessor processing capability in advance to those programs with short operating cycles and to those programs with long operating cycles. However, in some cases the number of programs actually operating does not correspond to the publications of processing capability that have been set in advance. Because of this, if, for example, there is a large number of programs with short operating cycles, the processing capability of the microprocessor, if allocated in advance to processing programs having short operating cycles, will end up being inadequate, while, on the other hand, if there are only a few programs with long operating cycles, then a situation will arise wherein there will be openings in the processing capability of the microprocessor, if allocated in advance to processing programs with long operating periods. The result is that there are problems in that the processing capability of the microprocessor is wasted.

SUMMARY OF THE INVENTION

Given this, one object of the present invention is to enable the provision of a data processing device, a scheduler, and a scheduling method that enable the efficient operation of a plurality of programs with mutually differing operating periods. An illustrative embodiment is summarized as a data processing device comprising: a unit time calculating unit for calculating, as a unit time, the greatest common denominator of the individual operating times of a plurality of programs; an allocating unit for allocating the individual operating cycles of the plurality of programs into each of a plurality of continuous base periods that each have their respective unit times, in sequence beginning with the shortest operating cycles, and for allocating the operating times of remaining programs for which the operations have not been completed during one of the plurality of base periods into base periods that are after the one base period, in sequence beginning with the shortest operating cycles; and an operating unit for running the plurality of programs that are allocated to the respective operating times within the plurality of base periods. The data processing device according to the present invention enables a plurality of programs to be run efficiently, through allocating, in sequence beginning with the shortest operating cycles, a plurality of programs having different individual operating cycles, to a respective plurality of base periods.

Another illustrative embodiment is summarized as a scheduler comprising: a unit time calculating unit for calculating, as a unit time, the greatest common denominator of the individual operating times of a plurality of programs; and an allocating unit for allocating the individual operating cycles of the plurality of programs into each of a plurality of continuous base periods that each have their respective unit times, in sequence beginning with the shortest operating cycles, and for allocating the operating times of remaining programs for which the operations have not been completed during one of the plurality of base periods into base periods that are after the one base period, in sequence beginning with the shortest operating cycles. The scheduler according to the present invention enables a plurality of programs to be scheduled efficiently, through allocating, in sequence beginning with the shortest operating cycles, a plurality of programs having different individual operating cycles, to a respective plurality of base periods. Another illustrative embodiment is summarized as a scheduling method that includes: calculating, as a unit time, the greatest common denominator of the individual operating times of a plurality of programs; and allocating the individual operating cycles of the plurality of programs into each of a plurality of continuous base periods that each have their respective unit times, in sequence beginning with the shortest operating cycles; and allocating the operating times of remaining programs for which the operations have not been completed during one of the plurality of base periods into base periods that are after the one base period, in sequence beginning with the shortest operating cycles. The scheduling method according to the present invention enables a plurality of programs to be scheduled efficiently, through allocating, in sequence beginning with the shortest operating cycles, a plurality of programs having different individual operating cycles, to a respective plurality of base periods.

The present invention enables the provision of a data processing device, a scheduler, and a scheduling method that enable the efficient operation of a plurality of programs with mutually differing operating cycles.

BRIEF DESCRIPTION OF THE DRAWINGS

The forgoing and other features of the present invention will be more readily apparent from the following detailed description and drawings of illustrative ennoblements of the invention in which.

DETAILED DESCRIPTION OF THE INVENTION

A form of embodiment of the present invention will be described below. In the descriptions of the drawings below, identical or similar portions are identified with identical or similar codes. Note that the drawings are schematic. Consequently, specific dimensions, and the like, must be determined in light of the explanation below. Furthermore, between the different drawings there will, of course, be differences in the relationships and ratios between dimensions.

First Example of Embodiment

Figure 1:
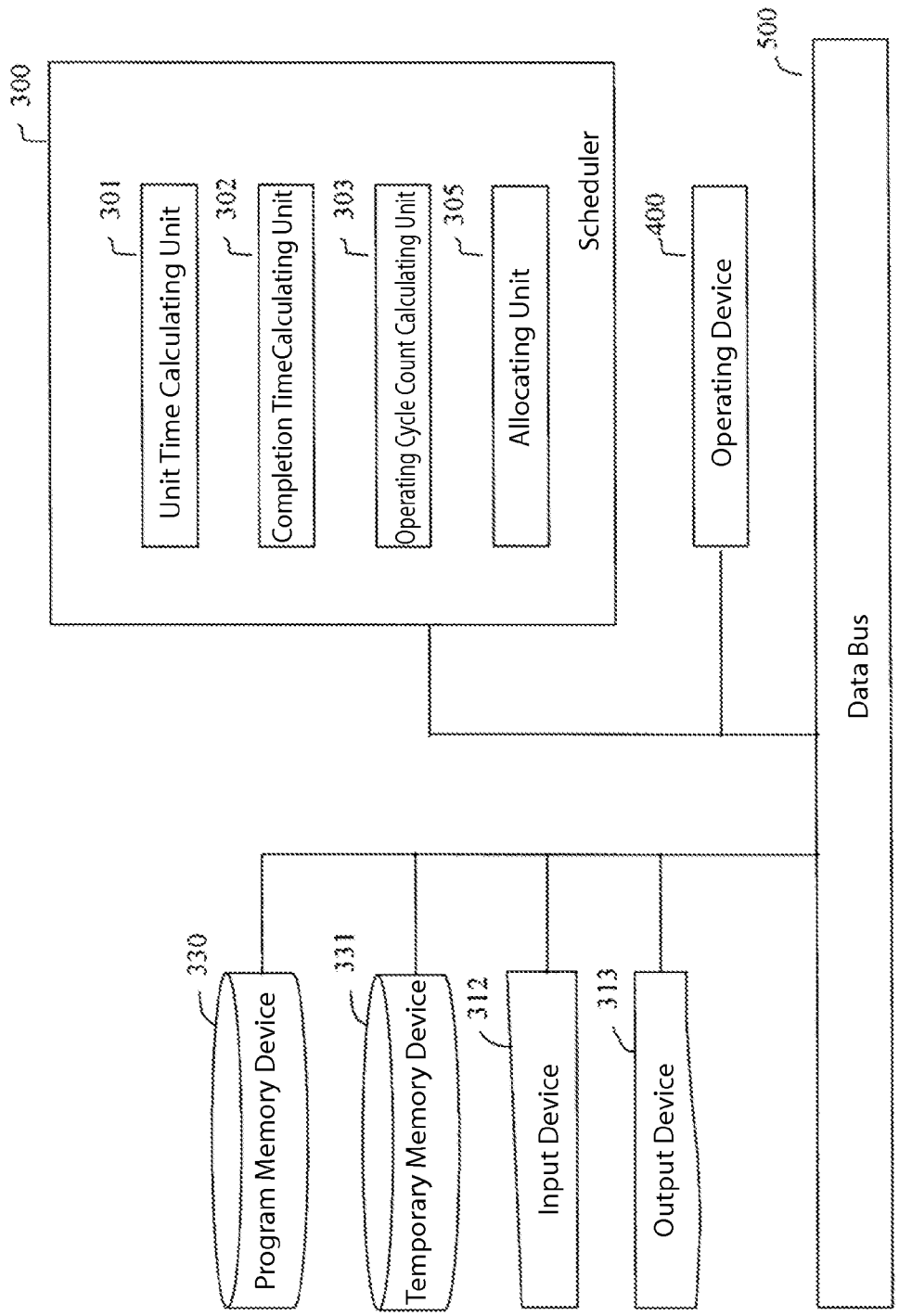
FIG. 1 is a schematic diagram illustrating a data processing device according to a first form of embodiment according to the present invention.

As illustrated in FIG. 1, a data processing device as set forth in a first form of embodiment is provided with a scheduler 300. The scheduler 300 is provided with a unit time calculating unit 301 for calculating, as a unit time, the greatest common denominator of the individual operating times of a plurality of programs. The scheduler 300 further comprises an allocating unit 305 for allocating the individual operating cycles of the plurality of programs into each of a plurality of continuous base periods that each have their respective unit times, in sequence beginning with the shortest operating cycles, and for allocating the operating times of remaining programs for which the operations have not been completed during one of the plurality of base periods into base periods that are after the one base period, in sequence beginning with the shortest operating cycles. Additionally, the data processing device is provided with an operating unit 400 for running the plurality of programs that are allocated to the respective operating times within the plurality of base periods.

The scheduler 300 and the operating device 400 are connected by a data bus 500 for conveying electrical signals. A program memory device 330 for storing a plurality of programs, each having different operating cycles, is also connected to the data bus 500. Each of the plurality of programs contains a plurality of operating blocks. Here the explanation will be for a case, as an example, wherein the program memory device 330 stores a first through fourth program.

The first program, for example, includes 25 functional blocks that are run with an operating cycle of 100 ms. In the first form of embodiment, if the operating time required for running a single functional block on the operating device 400 is 2 ms, then the operating time required for running one cycle of the first program will be 50 ms. The second program, for example, includes 30 functional blocks that are run with an operating cycle of 200 ms. In this case, the operating time required for running one cycle of the second program will be 60 ms.

The third program, for example, includes 25 functional blocks that are run with an operating cycle of 500 ms. In this case, the operating time required for running one cycle of the third program will be 50 ms. The fourth program, for example, includes 50 functional blocks that are run with an operating cycle of 1000 ms. In this case, the operating time required for running one cycle of the fourth program will be 100 ms.

The unit time calculating unit 301 reads each of the operating cycles for the first through fourth programs from the program memory device 330 through the data bus 500. The unit time calculating unit 301 then calculates, as the unit time, the greatest common denominator of the operating cycles of the individual first through fourth programs. Here the operating cycles for the first program, the second program, the third program, and the fourth program are, respectively, 100 ms, 200 ms, 500 ms, and 1000 ms, and thus the greatest common denominator that is calculated as the unit time is 100 ms. Note that if the values for the operating cycles for the first through fourth programs are not integers, then, for example, the units may be converted so that the values for the operating cycles can be expressed as integers. For example, if, in the program memory device 330, the calculating times for the respective first through fourth programs are stored as 0.1 seconds, 0.2 seconds, 0.5 seconds, and 1 second, then the values of the operating cycles can be expressed as integers by converting the units from seconds into milliseconds.

The scheduler 300 is further provided with a completion time calculating unit 302 and an operating cycle count calculating unit 303. The completion time calculating unit 302 and the operating cycle count calculating unit 303 read each of the operating cycles for the first through fourth programs from the program memory device 300 through the data bus 500.

Furthermore, the completion time calculating unit 302 calculates, as the completion time required for completing at least one cycle of the operations of all of the first through fourth programs, the least common multiple of the individual operating cycles of the individual first through fourth programs. Here the least common multiple of the operating cycles of the individual first through fourth programs, calculated as the completion time, is 1000 ms. Note that if the values for the operating cycles for the first through fourth programs are not integers, then, as described above, the units may be converted so that the values for the operating cycles can be expressed as integers.

The operating cycle count calculating unit 303 receives the calculated completion time from the completion time calculating unit 302. By dividing, by the program operating period operating cycle, the completion time that has been received, the operating cycle count calculating unit 303 then calculates the total number of operating cycles whereby the operating device 400 can run a program by the time the completion time is reached. If, at this point, the completion time is 1000 ms, then the total operating cycle count for the first program, which has an operating cycle of 100 ms, will be 10, and the total operating cycle count for the second program, which has an operating cycle of 200 ms, will be 5. Additionally, the total operating cycle count for the third program, which has an operating cycle of 500 ms, will be 2, and the total operating cycle count for the fourth program, which has an operating cycle of 1000 ms, will be 1.

The allocating unit 305 reads each of the operating cycles and the per-cycle operating times for the first through fourth programs from the program memory device 330 through the data bus 500. Additionally, the allocating unit 305 receives, from the unit time calculating unit 301, the time that has been calculated, and receives, from the completion time calculating unit 302, the completion time that has been calculated, and receives, from the operation cycle count calculating unit 303, the total operation cycle counts that have been calculated.

The allocating unit 305 then calculates, as the number of base periods to be set, the number that is the completion time divided by the unit time. If the completion time is 1000 ms and the unit time is 100 ms, then the plural number of base periods to be set will be 10. Here the allocating unit 305 assigns the individual operating times for the first through fourth programs into the first through 10th base periods until the operating cycle counts for each of the first through fourth programs reaches the total operating cycle count calculated by the operation cycle count calculating unit 303.

Figure 2:
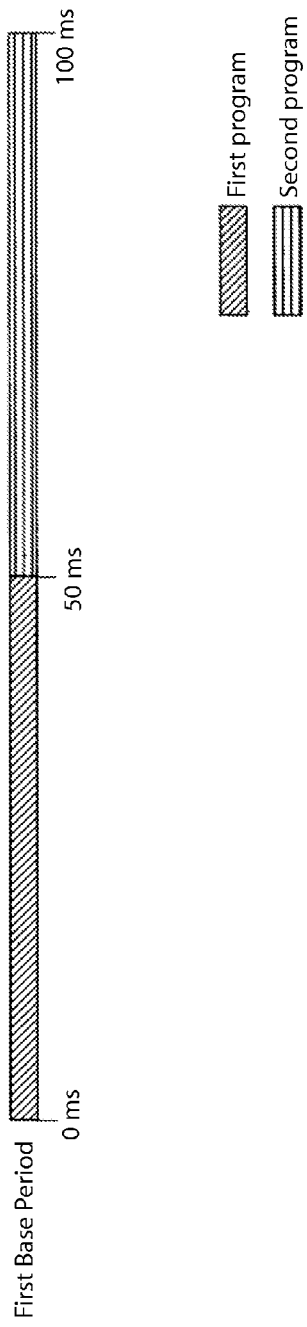
FIG. 2 is a first schematic diagram illustrating an operating time allocating method according to a first form of embodiment according to the present invention.

As illustrated in FIG. 2, the allocating unit 305 sets up the first base period having a unit time of the 100 ms calculated by the unit time calculating unit 301 and attempts to allocate each of the operating times of the first through fourth programs, in sequence from the shortest to the longest operating cycles, into the first base period. Because the operating cycle for the first program is the shortest, the allocating unit 305 allocates the operating time for the first program to the beginning of the first base period. The allocating unit 305 subtracts 1 from the total operating cycle count for the first program calculated by the operating cycle count calculating unit 303, leaving the remaining operating cycle count for the first program at 9.

Because the operating time required for one cycle of operation of the first program is 50 ms, the remaining open time in the first base period after the allocation of the operating time of the first program will be 50 ms. Given this, the allocating unit 305 attempts to allocate the second program operating time, which is the next shortest operating cycle after that of the first program, to after the first program operating time in the first base period. However, the operating time required for running one cycle of the second program will be 60 ms. Because of this, the allocating unit 305 allocates only the first 50 ms of the 60 ms operating time of the second program into the first base period. Additionally, the allocating unit 305 saves, as operating time to be allocated into the next base period, the remaining 10 ms of operating time of the second program that could not be allocated into the first base period.

Figure 3:
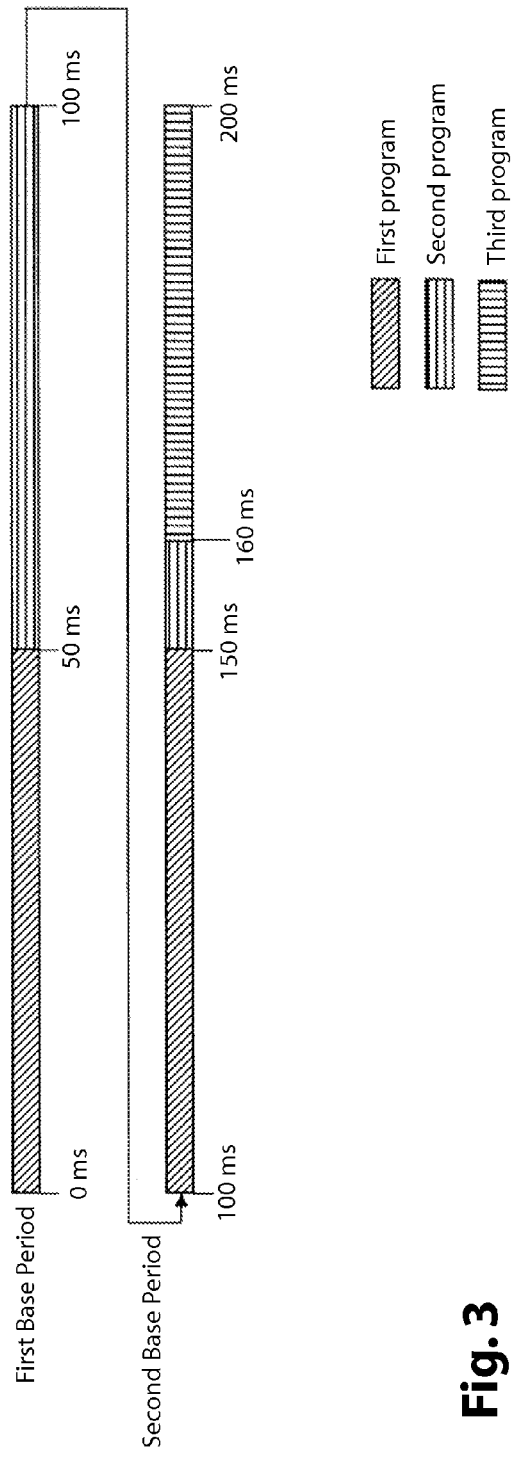
FIG. 3 is a second schematic diagram illustrating an operating time allocating method according to a first form of embodiment according to the present invention.

Because the allocation of operating time into the first base period has been completed, the allocating unit 305 illustrated in FIG. 1 sets up the second base period, as illustrated in FIG. 3, and attempts to allocate, into the second base period, the individual operating times of the first through fourth programs, in sequence from the shortest to the longest operating cycles. The allocating unit 305 allocates the operating time for the first program to the beginning of the second base period. Additionally, the allocating unit 305 decrements the remaining operating cycle count for the first program by 1, decrementing it to 8.

Additionally, the allocating unit 305 attempts to allocate the second program operating time to after the first program operating time in the second base period. Given this, the remaining 10 ms of operating time of the second program that could not be allocated into the first base period is left over as operating time to be allocated into a base period after the first base period. Because of this, the allocating unit 305 allocates the remaining 10 ms of operating time for the second program into the middle of the second base period. As a result, the operation for the first cycle of the second program is completed, so the allocating unit 305 subtracts 1 from the total operating cycle count for the second program calculated by the operating cycle count calculating unit 303, leaving the remaining operating cycle count for the second program at 4.

After the second program operating time has been allocated, then 40 ms of open time will remain in the second base period. Because the operating cycle for the second program is 200 ms, when the allocation using the second base period has been completed, the operation of the second cycle for the second program need not begin starting in the third case period. Given this, the allocating unit 305 attempts to allocate the third program operating time, which is the next shortest operating time after that of the second program, to after the second program operating time in the second base period. However, the operating time required for running one cycle of the third program will be 50 ms. Because of this, the allocating unit 305 allocates the first 40 ms of the 50 ms operating time of the third program into the second base period. Additionally, the allocating unit 305 saves, as operating time to be allocated into the next base period, the remaining 10 ms of operating time of the third program that could not be allocated into the second base period.

Figure 4:
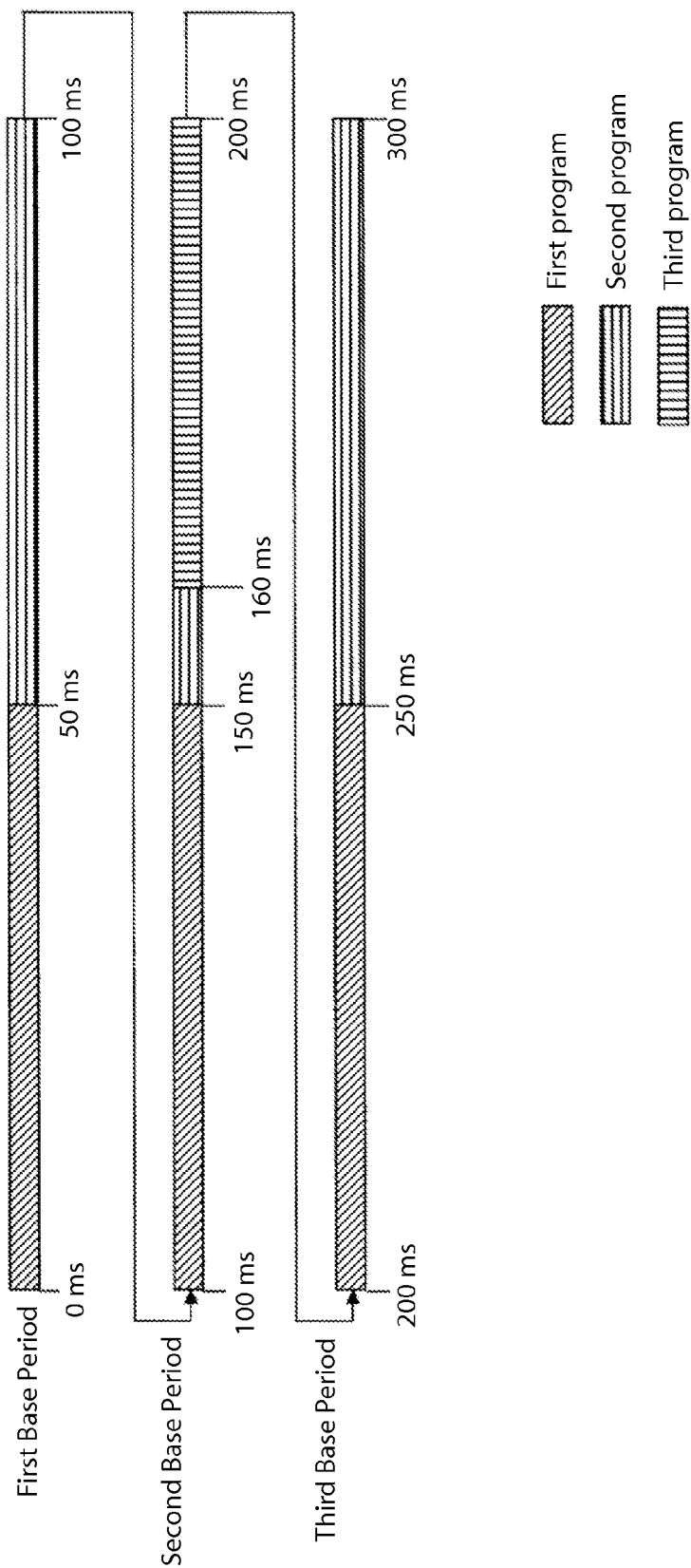
FIG. 4 is a third schematic diagram illustrating an operating time allocating method according to a first form of embodiment according to the present invention.

Because the allocation of operating time into the second base period has been completed, the allocating unit 305 illustrated in FIG. 1 sets up the third base period, as illustrated in FIG. 4, and attempts to allocate, into the third base period, the individual operating times of the first through fourth programs, in sequence from the shortest to the longest operating cycles. The allocating unit 305 allocates the operating time for the first program to the beginning of the third base period. Additionally, the allocating unit 305 decrements the remaining operating cycle count for the first program by another 1, decrementing it to 7.

Additionally, the allocating unit 305 allocates 50 ms of the 60 ms operating time of the second program into the third base period after the operating time for the first program. Additionally, the allocating unit 305 saves, as operating time to be allocated into the next base period, the remaining 10 ms of operating time of the second program that could not be allocated into the third base period.

Figure 5:
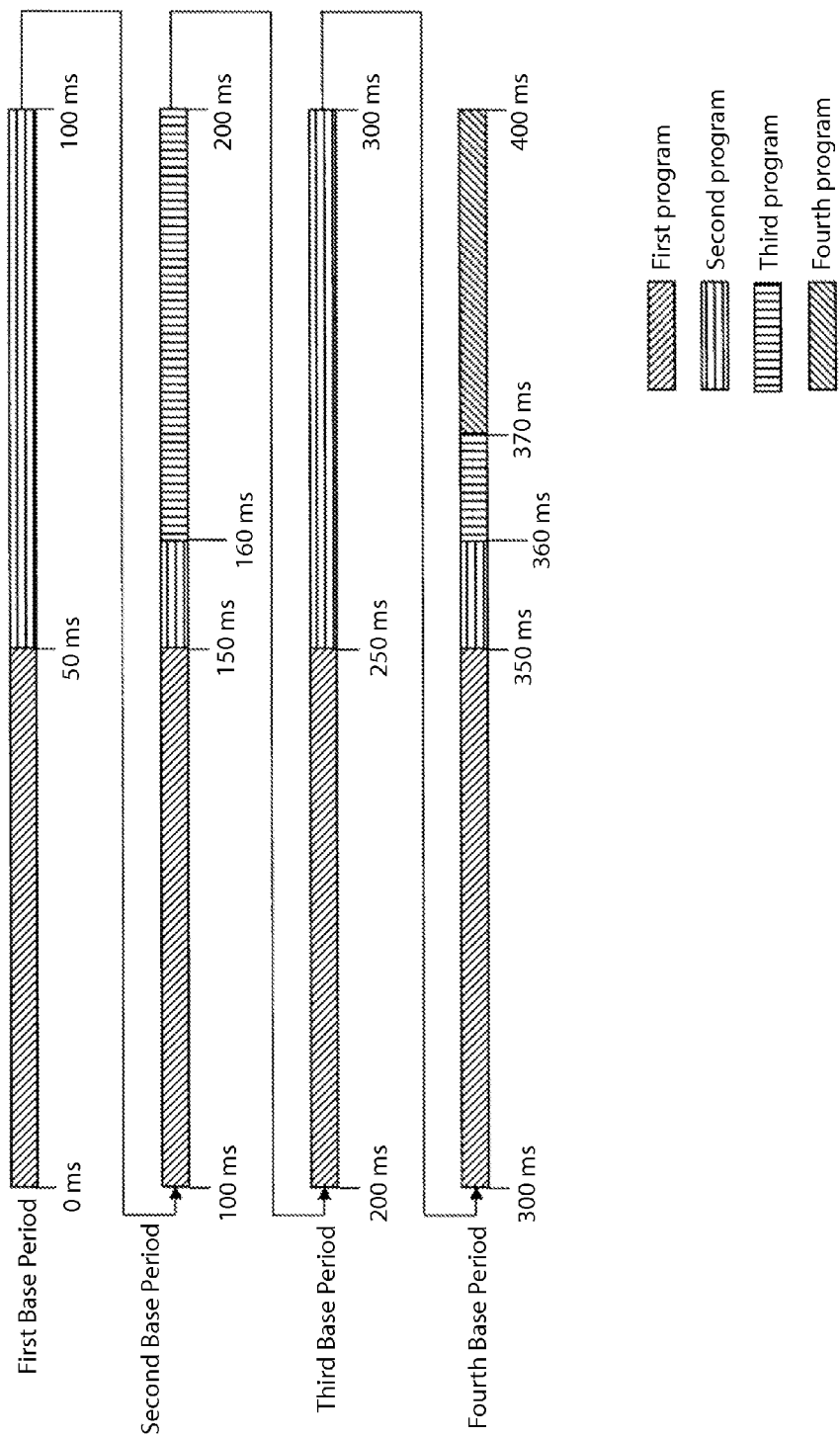
FIG. 5 is a fourth schematic diagram illustrating an operating time allocating method according to a first form of embodiment according to the present invention.

Because the allocation of operating time into the third base period has been completed, the allocating unit 305 illustrated in FIG. 1 sets up the fourth base period, as illustrated in FIG. 5, and attempts to allocate, into the fourth base period, the individual operating times of the first through fourth programs, in sequence from the shortest to the longest operating cycles. The allocating unit 305 allocates the operating time for the first program to the beginning of the fourth base period. Additionally, the allocating unit 305 decrements the remaining operating cycle count for the first program by another 1, decrementing it to 6.

Additionally, the allocating unit 305 allocates the remaining 10 ms operating time of the second program that could not be allocated into the third base period into the fourth base period after the operating time for the first program. Because this completes the operation for the second cycle of the second program, the allocating unit 305 decrements the remaining operating cycle count for the second program by another 1, decrementing it to 3. After this, there will be 40 ms of open time remaining in the fourth base period. Given this, the allocating unit 305 allocates the remaining 10 ms operating time of the third program that could not be allocated into the second base period into the fourth base period after the operating time for the second program. As a result, the operation for the first cycle of the third program is completed, so the allocating unit 305 subtracts 1 from the total operating cycle count for the third program calculated by the operating cycle count calculating unit 303, leaving the remaining operating cycle count for the third program at 1. After this, there will be 30 ms of open time remaining in the fourth base period.

Given this, the allocating unit 305 attempts to allocate the fourth program operating time, which is the next shortest operating cycle after that of the third program, to after the third program operating time in the third base period. However, the operating time required for running one cycle of the fourth program will be 100 ms. Because of this, the allocating unit 305 allocates the first 30 ms of the 100 ms operating time of the fourth program into the fourth base period. Additionally, the allocating unit 305 saves, as operating time to be allocated into the next base period, the remaining 70 ms of operating time of the fourth program that could not be allocated into the fourth base period.

Figure 6:
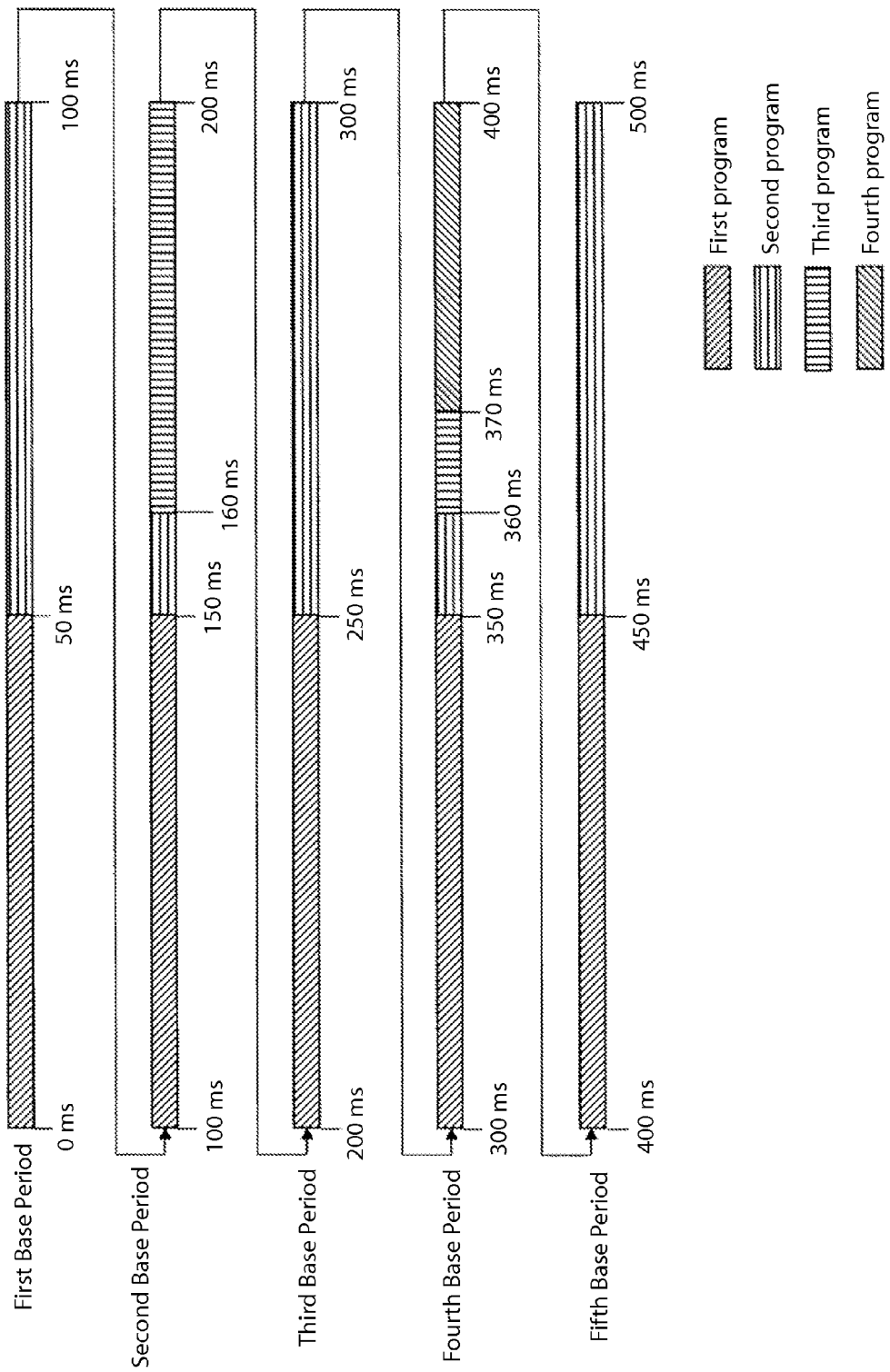
FIG. 6 is a fifth schematic diagram illustrating an operating time allocating method according to a first form of embodiment according to the present invention.

Because the allocation of operating time into the fourth base period has been completed, the allocating unit 305 illustrated in FIG. 1 sets up the fifth base period, as illustrated in FIG. 6, and attempts to allocate, into the fifth base period, the individual operating times of the first through fourth programs, in sequence from the shortest to the longest operating cycles. The allocating unit 305 allocates the operating time for the first program to the beginning of the fifth base period. Additionally, the allocating unit 305 decrements the remaining operating cycle count for the first program by another 1, decrementing it to 5.

Additionally, the allocating unit 305 allocates 50 ms of the 60 ms operating time of the second program into the fifth base period after the operating time for the first program. Additionally, the allocating unit 305 saves, as operating time to be allocated into the next base period, the remaining 10 ms of operating time of the second program that could not be allocated into the fifth base period.

Figure 7:
FIG. 7 is a sixth schematic diagram illustrating an operating time allocating method according to a first form of embodiment according to the present invention.

Because the allocation of operating time into the fifth base period has been completed, the allocating unit 305 illustrated in FIG. 1 sets up the sixth base period, as illustrated in FIG. 7, and attempts to allocate, into the sixth base period, the individual operating times of the first through fourth programs, in sequence from the shortest to the longest operating cycles. The allocating unit 305 allocates the operating time for the first program to the beginning of the sixth base period. Additionally, the allocating unit 305 decrements the remaining operating cycle count for the first program by another 1, decrementing it to 4.

Additionally, the allocating unit 305 allocates the remaining 10 ms operating time of the second program that could not be allocated into the fifth base period into the sixth base period after the operating time for the first program. Because this completes the operation for the third cycle of the second program, the allocating unit 305 decrements the remaining operating cycle count for the second program by another 1, decrementing it to 2. Additionally, the allocating unit 305 allocates 40 ms of the 50 ms operating time of the third program into the sixth base period after the operating time for the second program. Additionally, the allocating unit 305 saves, as operating time to be allocated into the next base period, the remaining 10 ms of operating time of the third program that could not be allocated into the sixth base period.

Figure 8:
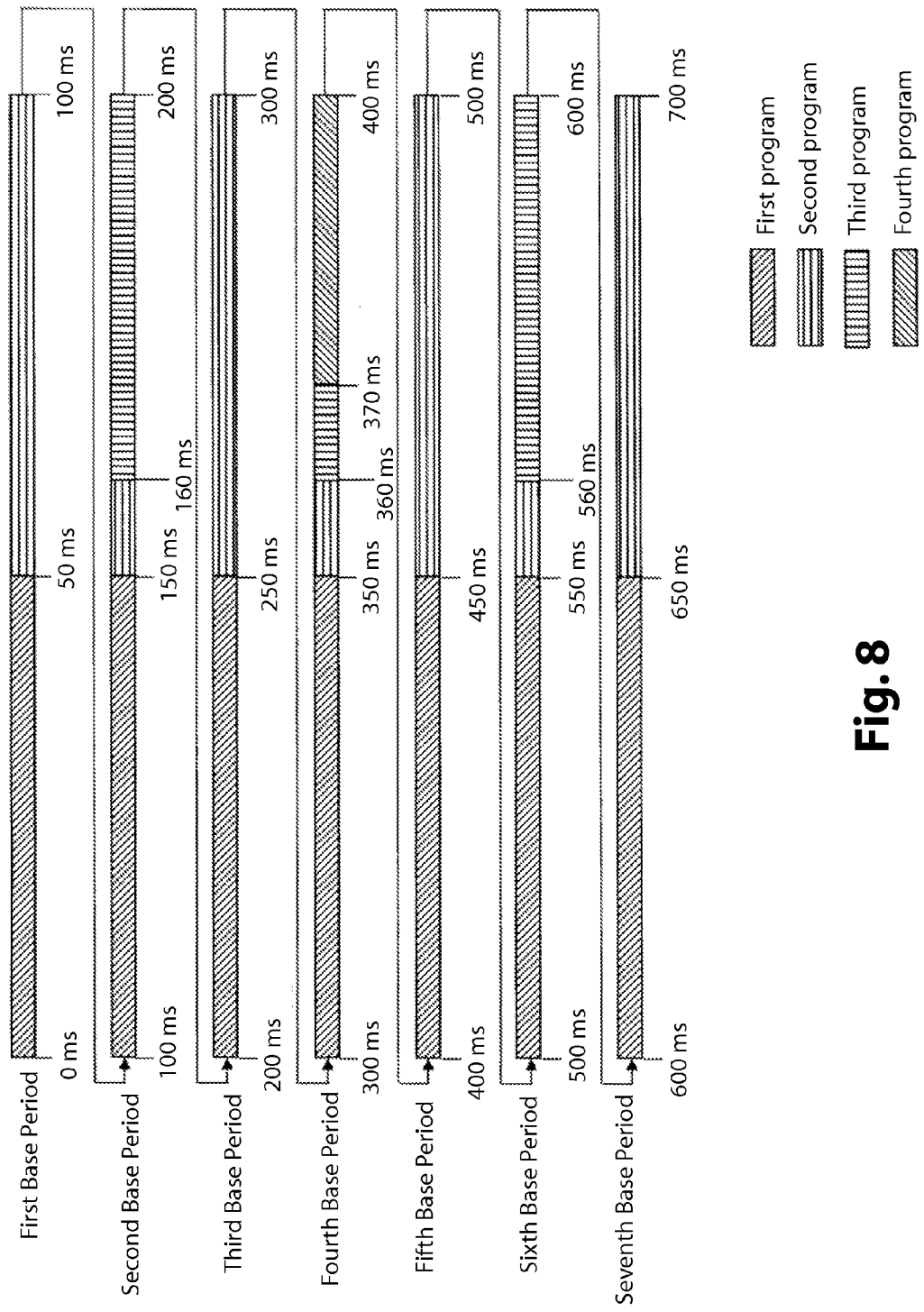
FIG. 8 is a seventh schematic diagram illustrating an operating time allocating method according to a first form of embodiment according to the present invention.

Because the allocation of operating time into the sixth base period has been completed, the allocating unit 305 illustrated in FIG. 1 sets up the seventh base period, as illustrated in FIG. 8, and attempts to allocate, into the seventh base period, the individual operating times of the first through fourth programs, in sequence from the shortest to the longest operating cycles. The allocating unit 305 allocates the operating time for the first program to the beginning of the seventh base period. Additionally, the allocating unit 305 decrements the remaining operating cycle count for the first program by another 1, decrementing it to 3.

Additionally, the allocating unit 305 allocates 50 ms of the 60 ms operating time of the second program into the seventh base period after the operating time for the first program. Additionally, the allocating unit 305 saves, as operating time to be allocated into the next base period, the remaining 10 ms of operating time of the second program that could not be allocated into the seventh base period.

Figure 9:
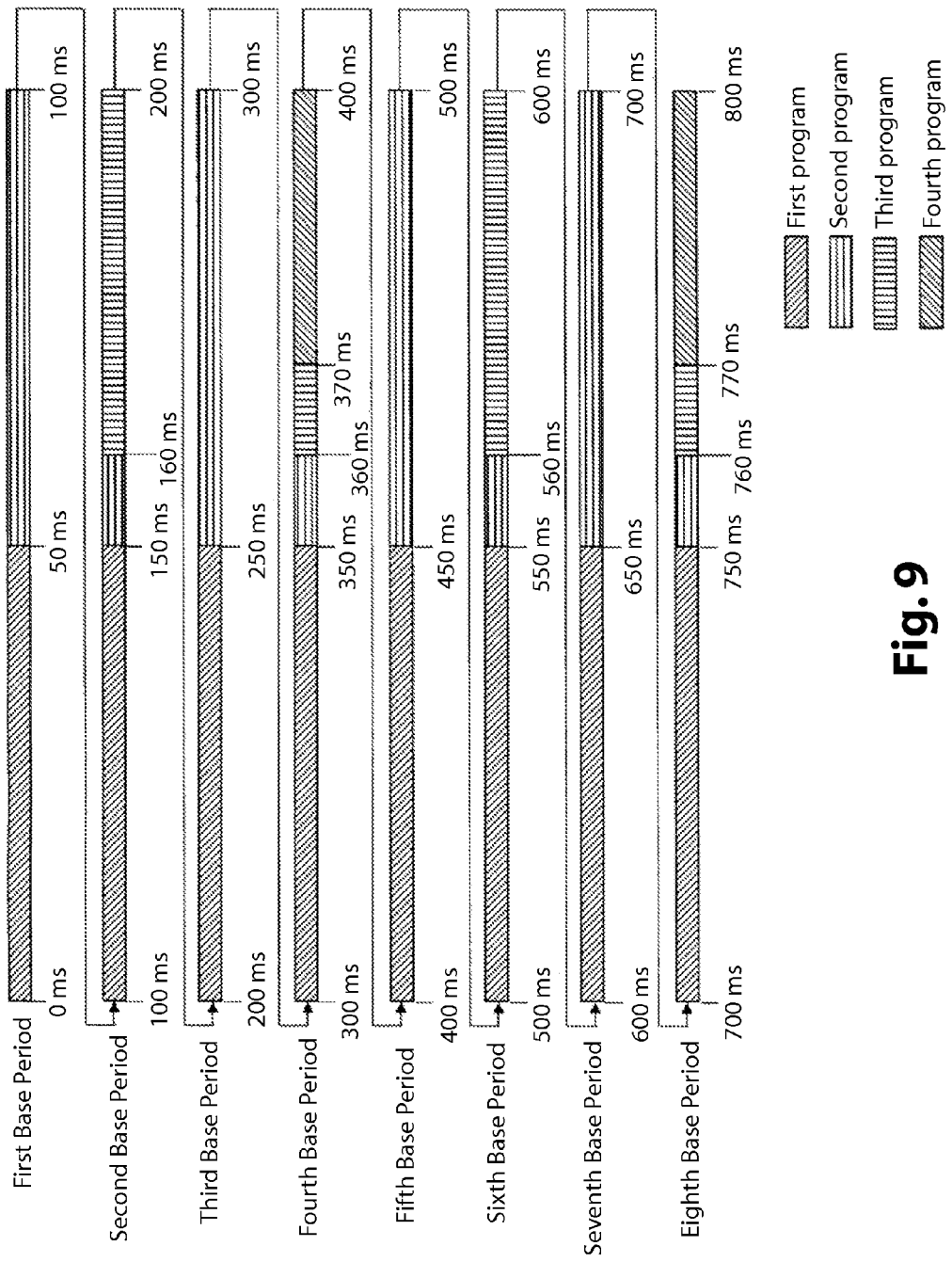
FIG. 9 is an eighth schematic diagram illustrating an operating time allocating method according to a first form of embodiment according to the present invention.

Because the allocation of operating time into the seventh base period has been completed, the allocating unit 305 illustrated in FIG. 1 sets up the eighth base period, as illustrated in FIG. 9, and attempts to allocate, into the eighth base period, the individual operating times of the first through fourth programs, in sequence from the shortest to the longest operating cycles. The allocating unit 305 allocates the operating time for the first program to the beginning of the eighth base period. Additionally, the allocating unit 305 decrements the remaining operating cycle count for the first program by another 1, decrementing it to 2.

Additionally, the allocating unit 305 allocates the remaining 10 ms operating time of the second program that could not be allocated into the seventh base period into the eighth base period after the operating time for the first program. Because this completes the operation for the fourth cycle of the second program, the allocating unit 305 decrements the remaining operating cycle count for the second program by another 1, decrementing it to 1.

Additionally, the allocating unit 305 allocates the remaining 10 ms operating time of the third program that could not be allocated into the sixth base period into the eighth base period after the operating time for the second program. Because this completes the operation for the second cycle of the third program, the allocating unit 305 decrements the remaining operating cycle count for the third program by another 1, decrementing it to 0. After this, there will be 30 ms of open time remaining in the eighth base period.

Given this, the allocating unit 305 attempts to allocate the remaining 70 ms operating time of the fourth program that could not be allocated into the fourth base period into the eighth base period after the operating time for the third program. However, because only 30 ms of open time remains, the allocating unit 202 allocates only the first 30 ms of the remaining 70 ms operating time of the fourth program into the eighth base period. Additionally, the allocating unit 305 further saves, as operating time to be allocated into the next base period, the remaining 40 ms of operating time of the fourth program that could not be allocated into the eighth base period.

Figure 10:
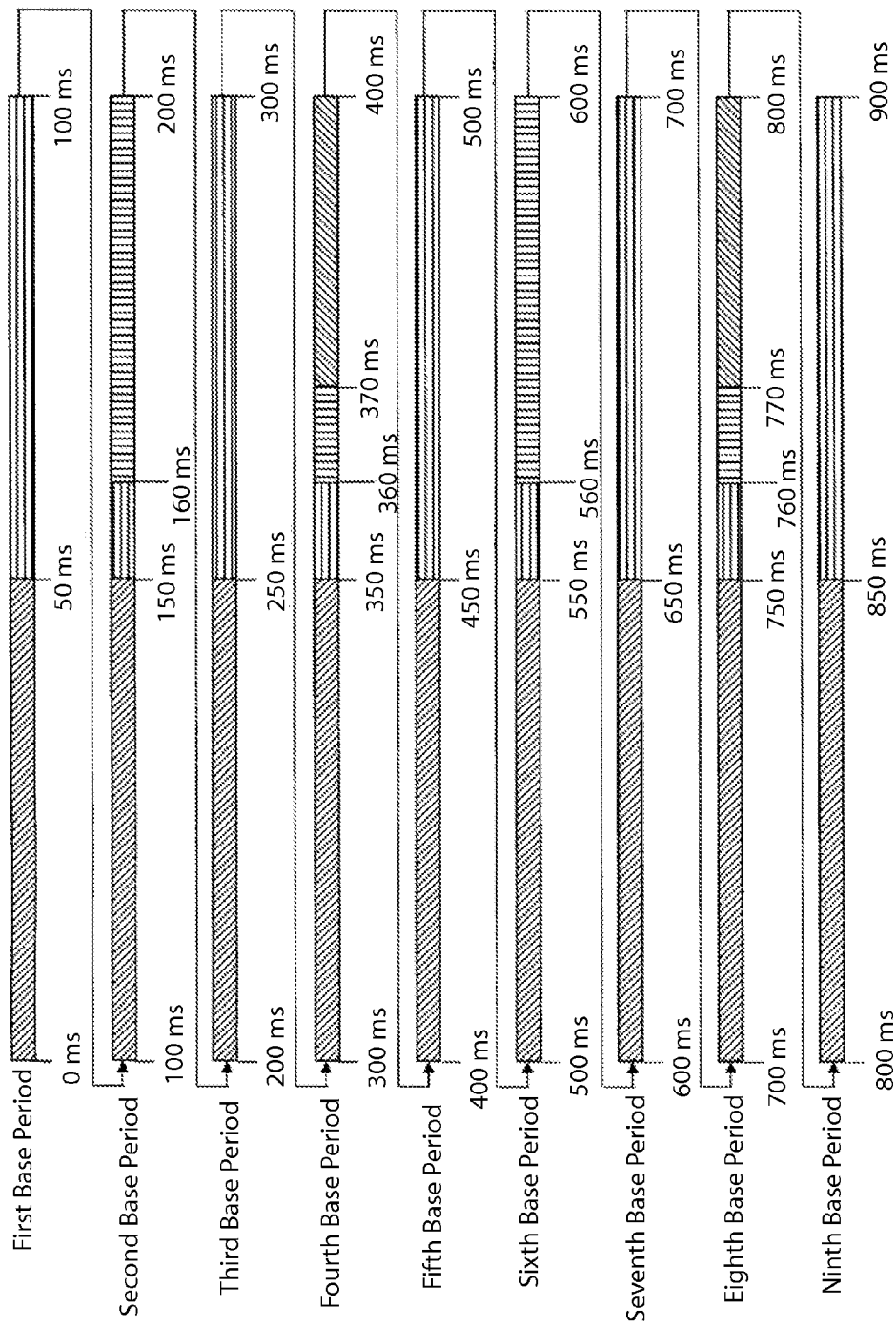
FIG. 10 is a ninth schematic diagram illustrating an operating time allocating method according to a first form of embodiment according to the present invention.

Because the allocation of operating time into the eighth base period has been completed, the allocating unit 305 illustrated in FIG. 1 sets up the ninth base period, as illustrated in FIG. 10, and attempts to allocate, into the ninth base period, the individual operating times of the first, second, and fourth programs, for which the remaining operating cycle count has not yet gone to 0, in sequence from the shortest to the longest operating cycles. The allocating unit 305 allocates the operating time for the first program to the beginning of the ninth base period. Additionally, the allocating unit 305 decrements the remaining operating cycle count for the first program by another 1, decrementing it to 1. Additionally, the allocating unit 305 allocates 50 ms of the 60 ms operating time of the second program into the ninth base period after the operating time for the first program. Additionally, the allocating unit 305 saves, as operating time to be allocated into the next base period, the remaining 10 ms of operating time of the second program that could not be allocated into the ninth base period.

Figure 11:
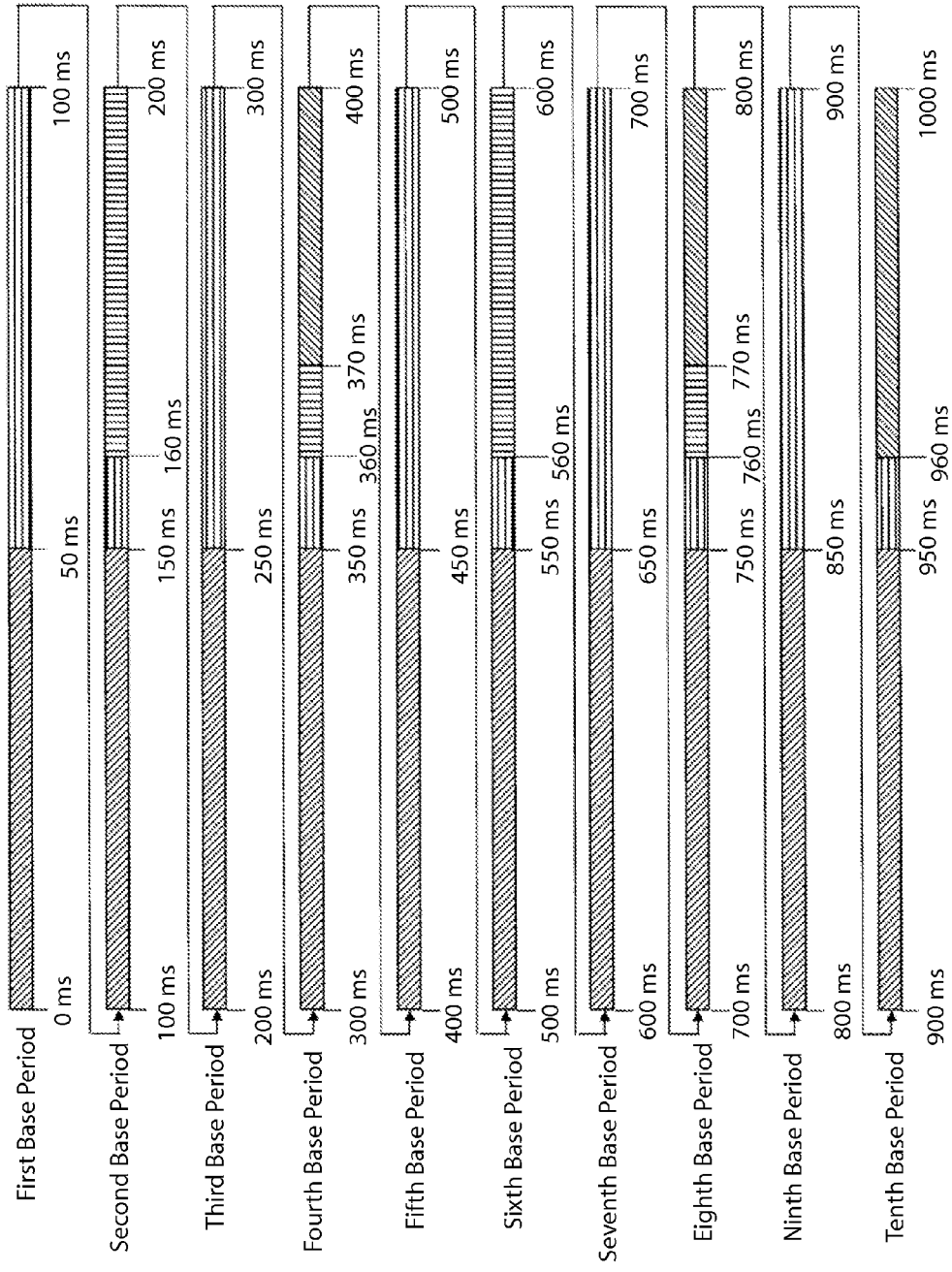
FIG. 11 is a tenth schematic diagram illustrating an operating time allocating method according to a first form of embodiment according to the present invention.

Because the allocation of operating time into the ninth base period has been completed, the allocating unit 305 illustrated in FIG. 1 sets up the tenth base period, as illustrated in FIG. 11, and attempts to allocate, into the tenth base period, the individual operating times of the first, second, and fourth programs, for which the remaining operating cycle count has not yet gone to 0, in sequence from the shortest to the longest operating cycles. The allocating unit 305 allocates the operating time for the first program to the beginning of the tenth base period. Additionally, the allocating unit 305 decrements the remaining operating cycle count for the first program by another 1, decrementing it to 0. Additionally, the allocating unit 305 allocates the remaining 10 ms operating time of the second program that could not be allocated into the ninth base period into the tenth base period after the operating time for the first program. Because this completes the operation for the fifth cycle of the second program, the allocating unit 305 decrements the remaining operating cycle count for the second program by another 1, decrementing it to 0.

The remaining operating cycle count for the third program, for which the operating cycle is shortest after the second program, has already gone to 0. Because of this, the allocating unit 305 does not allocate operating time for the third program into the tenth base period. The allocating unit 305 allocates the remaining 40 ms operating time of the fourth program that could not be allocated into the eighth base period into the tenth base period after the operating time for the second program. As a result, the operation for the first cycle of the fourth program is completed, so the allocating unit 305 subtracts 1 from the total operating cycle count for the fourth program calculated by the operating cycle count calculating unit 303, leaving the remaining operating cycle count for the fourth program at 0.

At a point in time that the allocation of the operating times into the tenth base period have been completed, we arrive at the completion time calculated by the completion time calculating unit 302 illustrated in FIG. 1. Additionally, the operating device 400 will cause the arrival at the total operating cycle counts for each of the first through fourth programs by the completion time calculated by the operating cycle count calculating unit 303. Because of this, the allocating unit 305 allocates the operating times for the first through the fourth programs to complete the creation of the schedule.

The operating unit 400 receives, from the scheduler 300, the allocations of the respective operating times for the first through fourth programs, illustrated in FIG. 11, produced by the allocating unit 305. Additionally, the operating device 400 illustrated in FIG. 1 reads out the first through fourth programs from the program memory device 330. Furthermore, the operating device 400 runs the first through fourth programs in accordance with the allocation schedule that has been received, illustrated in FIG. 11. Furthermore, after the operations have been completed in the tenth base period, processing returns to the first base period, and the operations for the first through fourth programs are repeated. Note that, the operating device 400 illustrated in FIG. 1 need not necessarily wait until the completion of the allocation schedule illustrated in FIG. 11 before running the first through fourth programs. For example, the operating device 400 may begin operations from the program allocated to the beginning of the first base period in parallel with the creation of the allocation schedule by the scheduler 300.

The temporary memory device 331, the input device 312, and the output device 313 are connected to the data bus 500 illustrated in FIG. 1. The temporary memory device 331 sequentially stores the processing results by the scheduler 300 and the operating device 400. Programs, and the like, that are stored in the program memory device 330 are inputted into the input device 312. The output device 313 outputs the allocation schedule for the programs, generated by the scheduler 300, operating results of the programs run by the operating device 400, and the like.

The data processing device as set forth in the first example of embodiment as described above enables efficient scheduling of the operating times for a plurality of programs while conforming to the operating cycles thereof. Furthermore, the data processing device as set forth in the first example of embodiment enables a reduction in wasted processing capability of the operating device 400 due to the continuous allocation of the operating times of the programs into the various base periods.

Second Example of Embodiment

Figure 12:
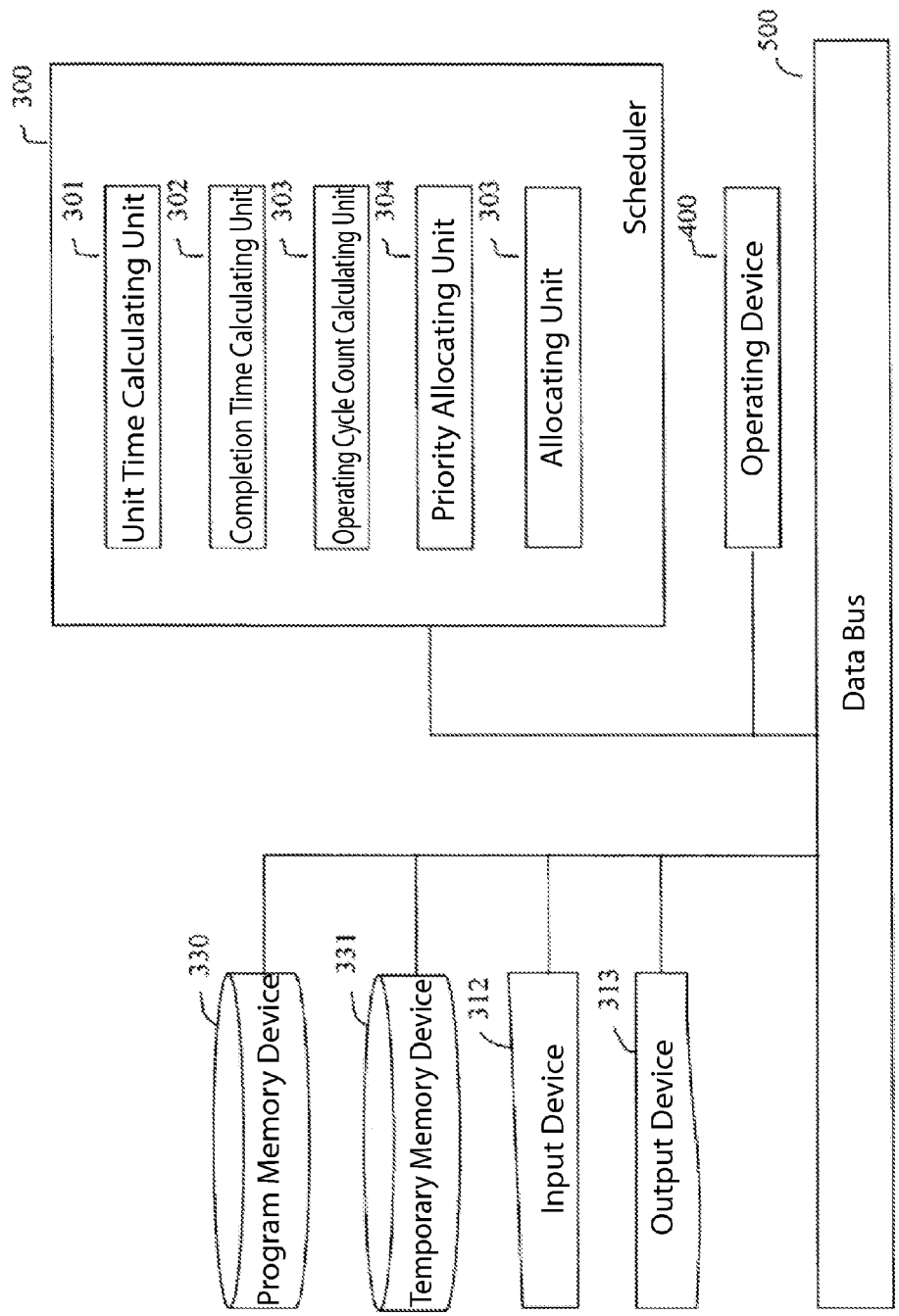
FIG. 12 is a schematic diagram illustrating a data processing device according to a second form of embodiment according to the present invention.

In regards to the second example of embodiment, first through third programs that are identical to those in the first form of embodiment are stored in a program memory device 330 of a data processing device illustrated in FIG. 12. Additionally, instead of the fourth program, a fifth program that includes 30 functional blocks to be run with an operating cycle of, for example, 1000 ms is stored in the program memory device 330 as set forth fourth in the second example of embodiment. If the operating time required for running a single functional block on the operating device 400 is 2 ms, then the operating time required for running one cycle of the fifth program will be 60 ms.

Additionally, a first timing specifying program that is specified by the user, such as, for example, to cause operations with a timing between 300 and 400 ms after another program is started up, is stored in the program memory device 330 as set forth in the second example of embodiment. The first timing specifying program includes, for example, five functional blocks. In this case, the operating time required for running one cycle of the first timing specifying program will be 10 ms.

Additionally, a second timing specifying program that is specified by the user, such as, for example, to cause operations with a timing between 800 and 900 ms after another program is started up, is stored in the program memory device 330 as set forth in the second example of embodiment. The second timing specifying program includes, for example, 15 functional blocks. In this case, the operating time required for running one cycle of the second timing specifying program will be 30 ms.

The unit time calculating unit 301 calculates, as the unit time, the greatest common denominator of the operating cycles of the first through third and fifth programs, as was the case with the first example of embodiment. Here the greatest common denominator that is calculated as the unit time is 100 ms. Furthermore, the operating cycle calculating unit 303 calculates, as the completion time required for completing at least one cycle of the operations of all of the first through third and fifth programs, the least common multiple of the individual operating cycles of the individual first through third and fifth programs. Here the least common multiple that is calculated as the completion time is 1000 ms.

The operating device 400 calculates the total operating cycle counts for each of the first through third and fifth programs by the completion time calculated by the operating cycle count calculating unit 303. Here the total operating cycle count for the first program is 10 times, the total operating cycle count for the second program is 5 times, the total operating cycle count for the third program is twice, and the total operating cycle count for the fifth program is once.

Figure 13:
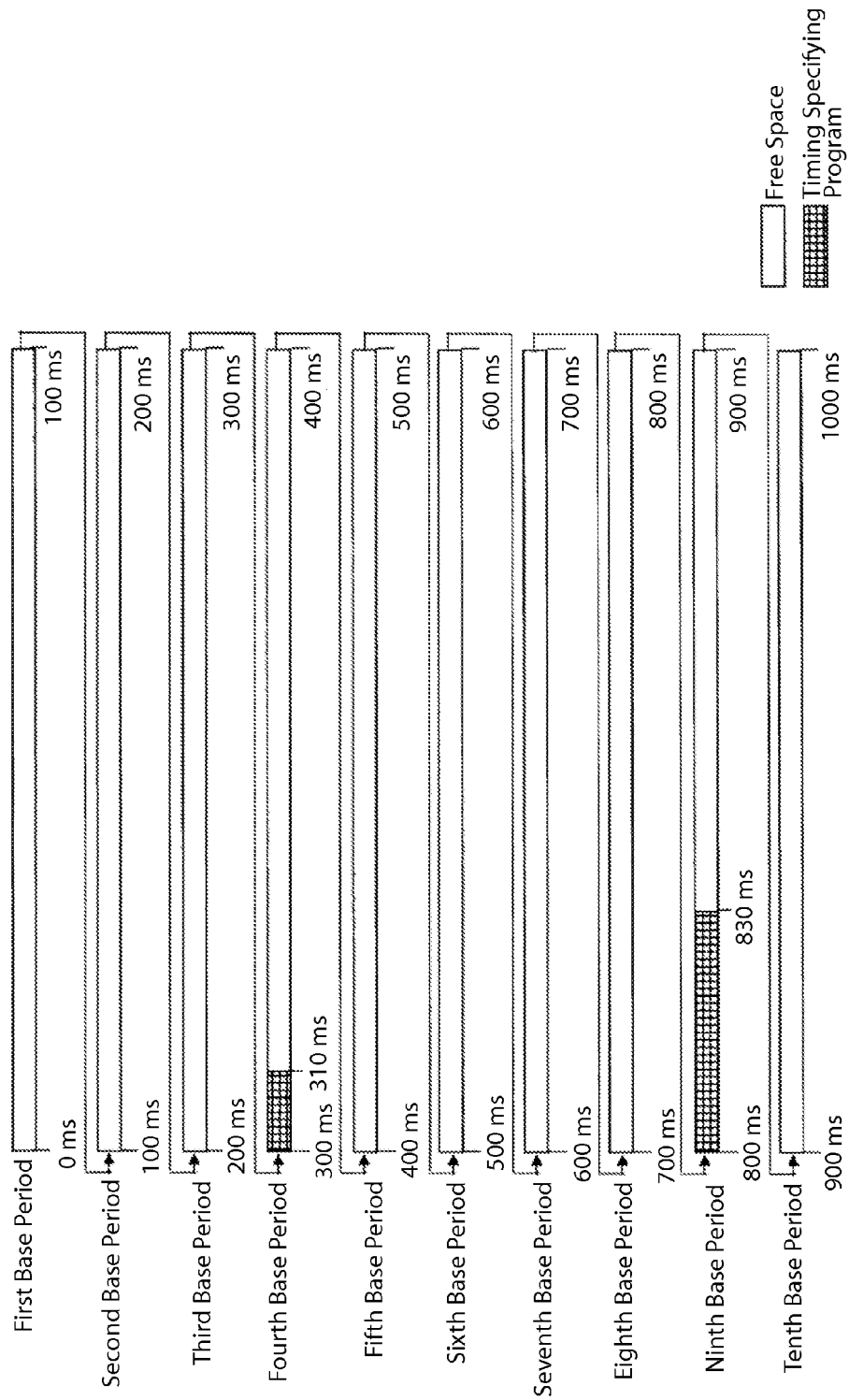
FIG. 13 is a first schematic diagram illustrating an operating time allocating method according to a second form of embodiment according to the present invention.

A scheduler 300 as set forth in a second form of embodiment is further provided with a priority allocating unit 304. The priority allocating unit 304 receives the unit time and the completion time, respectively, from the unit time calculating unit 301 and the completion time calculating unit 302. The priority allocating unit 304 then calculates, as the number of base periods, the number that is the completion time divided by the unit time. Here the number for the completion time divided by the unit time is 10, so the priority allocating unit 304, as illustrated in FIG. 13, sets up the first through tenth base periods. Additionally, the priority allocating unit 304 illustrated in FIG. 12 reads out, from the program memory device, the operating programs and operating times specified by the first and second timing specifying programs.

Next, the priority allocating unit 304, prior to allocating the operating times for the first through third and fifth programs into the first through tenth base periods, allocates the operating times of the first and second timing specifying programs. Here the first timing specifying program is specified so as to operate with a timing between 300 ms and 400 ms. Because of this, the priority allocating unit 304 allocates the 10 ms of operating time for the first timing specifying program into the beginning of the fourth base period. Additionally the second timing specifying program is specified so as to operate with a timing between 800 ms and 900 ms. Because of this, the priority allocating unit 304 allocates the 30 ms of operating time for the second timing specifying program into the beginning of the ninth base period.

Figure 14:
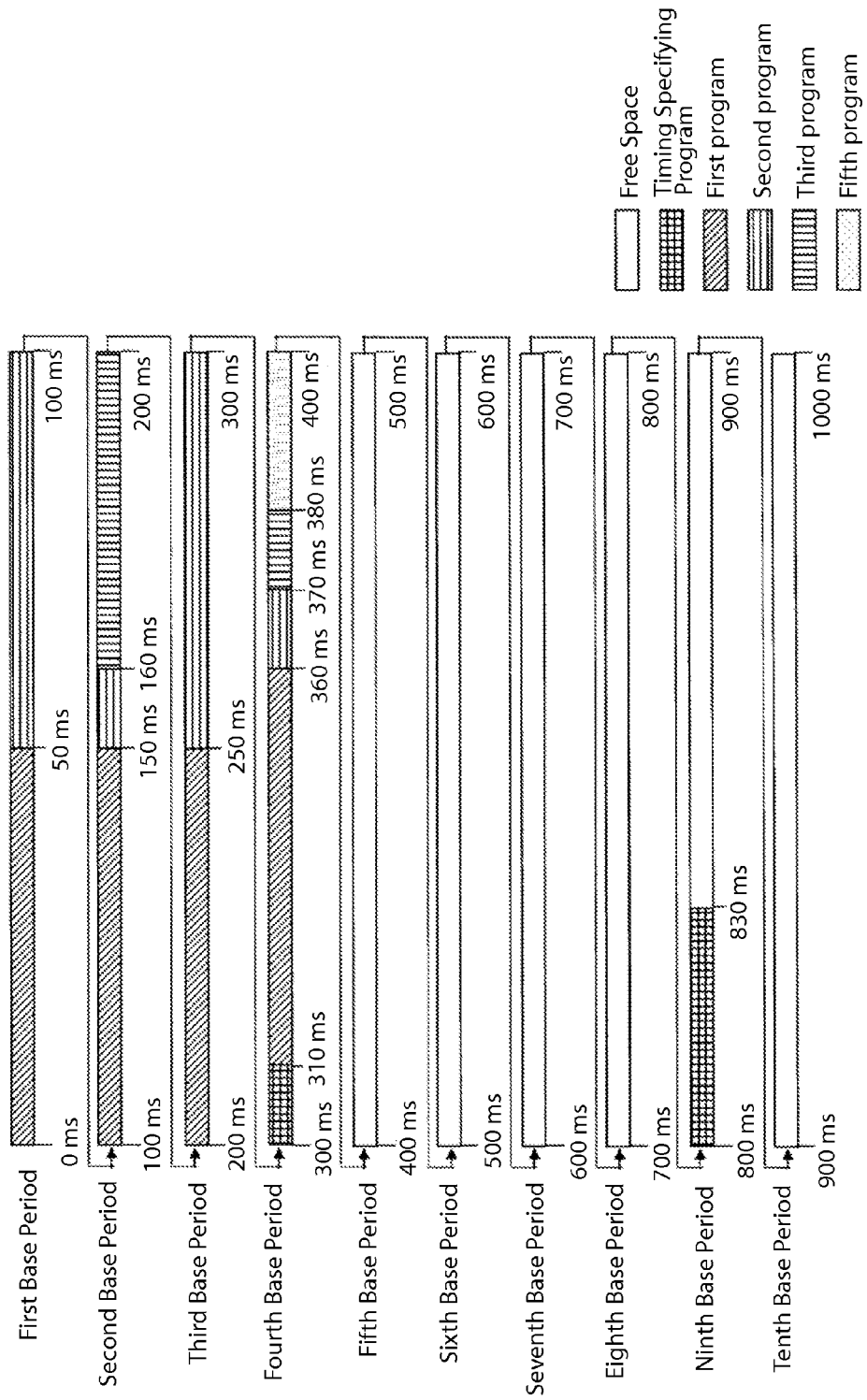
FIG. 14 is a second schematic diagram illustrating an operating time allocating method according to a second form of embodiment according to the present invention.

In the second example of embodiment, the allocating unit 305 illustrated in FIG. 12 allocates the individual operating times of the first through third and fifth programs into the first through tenth base periods after the priority allocating unit 304 allocates the operating times of the first and second timing specifying programs into the first through tenth base periods. Specifically, the allocating unit 305, as illustrated in FIG. 14, first allocates the operating times of the first through third programs into the first through third base periods in the same way as in the first example of embodiment.

Additionally, because the operating time of the first timing specifying program is already allocated to the first 10 ms of the fourth base period, the allocating unit 305 attempts to allocate the operating times of the first, third, and fifth programs into the fourth base period after the operating time for the first timing specifying program, in sequence starting with the shortest operating cycle. Given this, allocating unit 305 first allocates the operating time for the first program following the operating time of the first timing specifying program.

Additionally, the allocating unit 305 allocates the remaining 10 ms operating time of the second program that could not be allocated into the third base period into the fourth base period after the operating time for the first program. Additionally, the allocating unit 305 allocates the remaining 10 ms operating time of the third program that could not be allocated into the second base period into the fourth base period after the operating time for the second program. After this, there will be 20 ms of open time remaining in the fourth base period.

Figure 15:
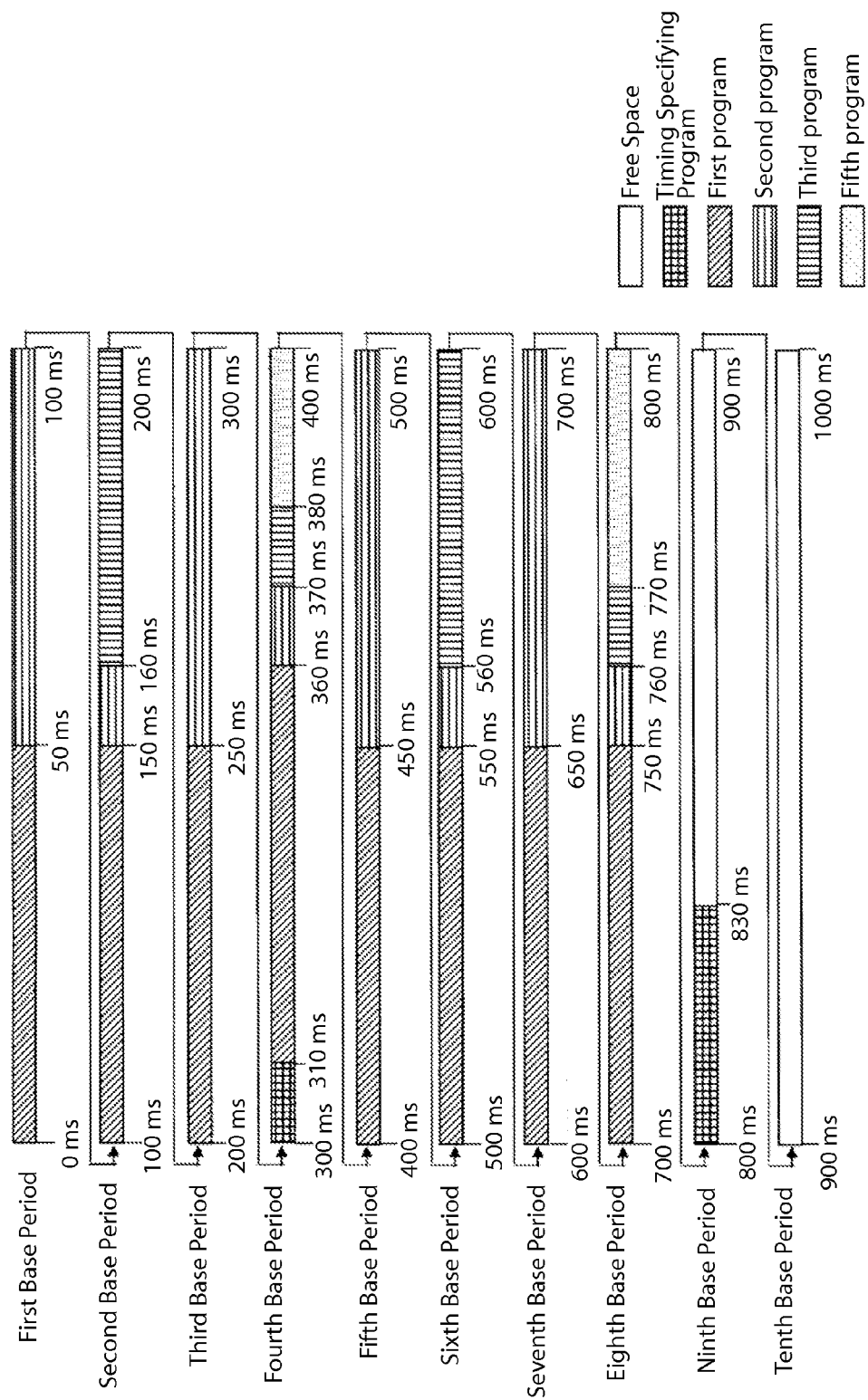
FIG. 15 is a third schematic diagram illustrating an operating time allocating method according to a second form of embodiment according to the present invention.

Given this, the allocating unit 305 attempts to allocate the fifth program operating time, which is the next shortest operating cycle after that of the third program, to after the third program operating time in the third base period. However, the operating time required for running one cycle of the fifth program will be 60 ms. Because of this, the allocating unit 305 allocates the first 20 ms of the 60 ms operating time of the fourth program into the fifth base period. Additionally, the allocating unit 305 saves, as operating time to be allocated into the next base period, the remaining 40 ms of operating time of the fifth program that could not be allocated into the fourth base period, as illustrated in FIG. 12. Thereafter, the allocating unit 305, as illustrated in FIG. 15, allocates the operating times of the fifth through seventh programs into the first through third base periods in the same way as in the first example of embodiment. Next, the allocating unit 305 allocates the operating times of the first through third programs into the eighth base period in the same way as in the first example of embodiment. After this, there will be 30 ms of open time remaining in the eighth base period.

Given this, the allocating unit 305 attempts to allocate the remaining 40 ms operating time of the fifth program that could not be allocated into the fourth base period into the eighth base period after the operating time for the third program. However, because only 30 ms of open time remains, the allocating unit 305 allocates only the first 30 ms of the remaining 40 ms operating time of the fifth program into the eighth base period. Additionally, the allocating unit 305 further saves, as operating time to be allocated into the next base period, the remaining 10 ms of operating time of the fifth program that could not be allocated into the eighth base period, as illustrated in FIG. 12.

Figure 16:
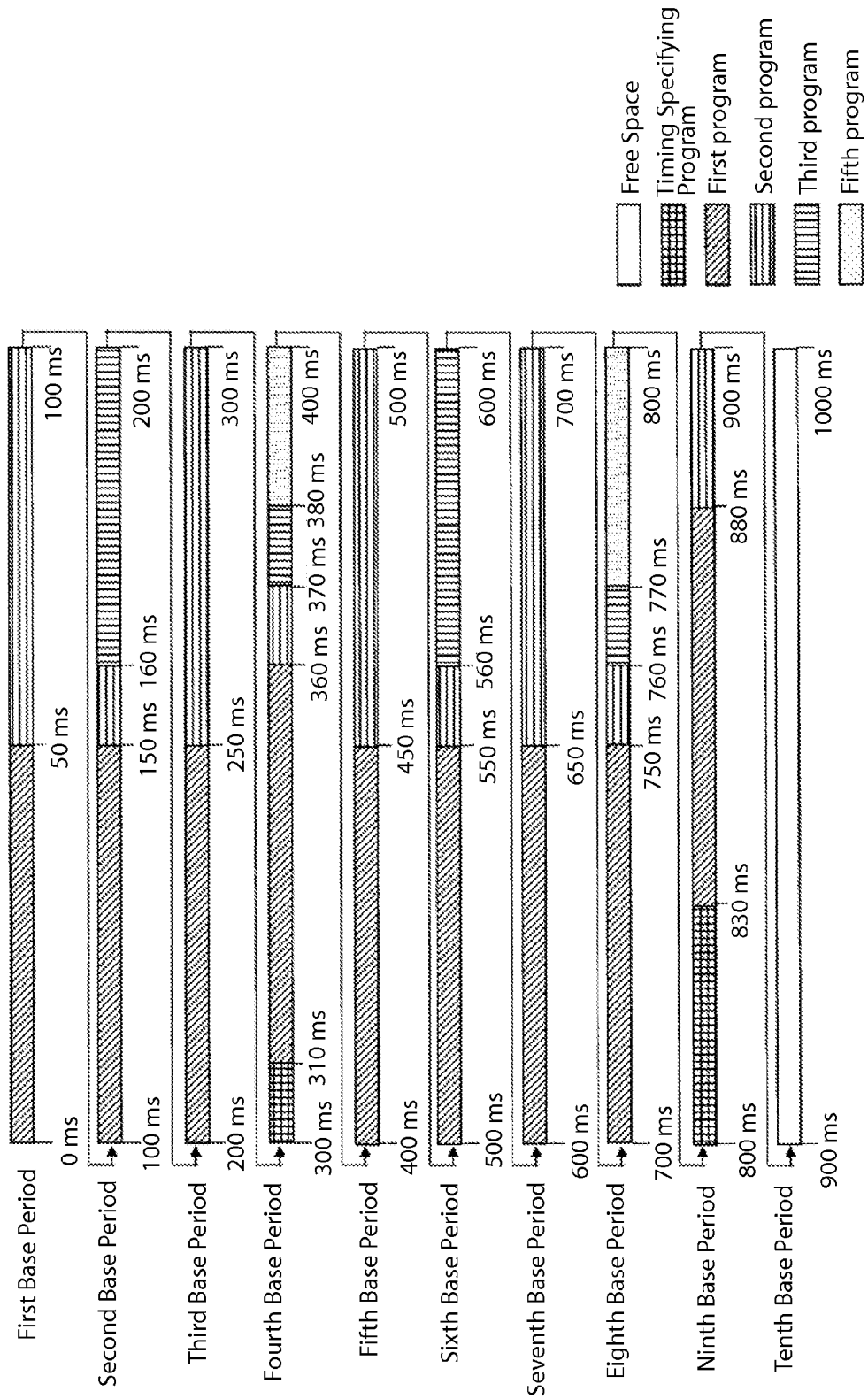
FIG. 16 is a fourth schematic diagram illustrating an operating time allocating method according to a second form of embodiment according to the present invention.
Figure 17:
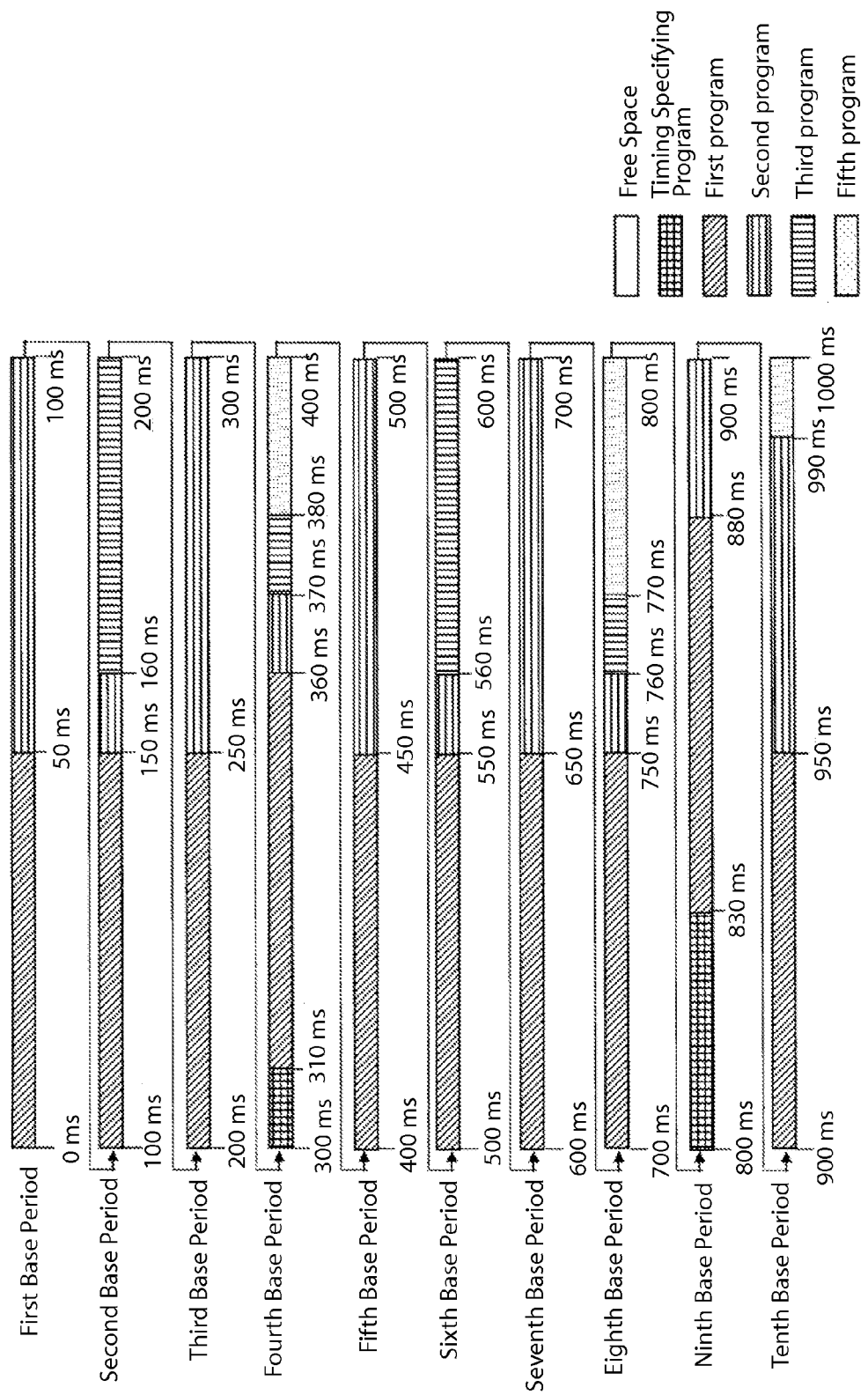
FIG. 17 is a fifth schematic diagram illustrating an operating time allocating method according to a second form of embodiment according to the present invention.

Next, as illustrated in FIG. 16, the operating time of the second timing specifying program has already been allocated to the first 30 seconds of the ninth base period. Given this, the allocating unit 305 attempts to allocate the operating times for the first through third and fifth programs to after the operating time for the second timing specifying program in the ninth base period, in sequence starting with the shortest operating cycle. Given this, allocating unit 305 first allocates the operating time for the first program following the operating time of the second timing specifying program.

Additionally, the allocating unit 305 allocates 20 ms of the 60 ms operating time of the second program into the ninth base period after the operating time for the first program.

Additionally, the allocating unit 305 saves, as operating time to be allocated into the next base period, the remaining 40 ms of operating time of the second program that could not be allocated into the ninth base period, as illustrated in FIG. 12.

Next, after first allocating the operating time for the first program into the tenth base period, the allocating unit 305 allocates the remaining 40 ms operating time of the second program, which could not be allocated into the ninth base period, after the operating time for the first program. Additionally, the allocating unit 305 allocates the remaining 10 ms operating time of the fifth program that could not be allocated into the eighth base period into the tenth base period after the operating time for the second program, to complete the creation of the allocation schedule for the operating times.

The other structural elements of the data processing device as set forth in the second example of embodiment are identical to those in the first example of embodiment, and thus explanations thereof are omitted. While preferably the allocation of the operating times of the programs is performed automatically, in some programs the user may wish to specify the allocation timing for the operating times. In contrast, in the data processing device as set forth in the second example of embodiment, the operating times for the timing specifying programs can be allocated as specified by the user, while the efficient allocation of the operating times for the other programs can be performed automatically.

While, as set forth above, the present invention was described using examples of embodiment, the descriptions and drawings that form a portion of this disclosure cannot be understood as limiting the invention. A variety of alternate embodiments, forms of embodiment, and implementation technologies should be clear to those skilled in the art. For example, if new programs are added to the program memory device 330 illustrated in FIG. 1, the operating cycles of programs that have been stored are modified, or programs that have been stored are deleted, then the scheduler 300 may perform rescheduling of the allocation of the program operating timer automatically. For example, the operating cycles, operating times, and the like shown in the examples of embodiment or no more than illustrative. For example, in a case wherein a program that runs at an operating cycle of 100 ms and a program that runs at an operating cycle of 250 ms are stored in the program memory device 330, then the unit time will be 50 ms, and the completion time will be 500 ms. In this way, the present invention should be understood to include a variety of forms of embodiment not described explicitly herein.

While the invention has been particularly shown and described with reference to a number of preferred embodiments thereof, it will be understood by those skilled in the art that various changes in form and details may be made therein without departing from the sprit and scope of the invention. Accordingly, the invention is to be limited only by the scope of the claims and their equivalents.

The invention claimed is:

1. A data processing device comprising:
 a scheduler configured to
  calculate, as a unit time, a greatest common denominator of individual operating cycles of a plurality of programs;
  allocate the individual operating cycles of the plurality of programs into each of a plurality of continuous base periods that each has the unit time, in sequence beginning with the shortest operating cycle;
  allocate the operating cycles of remaining programs for which the operations have not been completed during one of the plurality of base periods into remaining base periods, in sequence beginning with the shortest operating cycles;
  wherein the scheduler is further configured to calculate, as the completion time required for completing at least one cycle of all of the operations of a plurality of programs, the least common multiple of the operating cycles of the plurality of programs;
  wherein the scheduler is further configured to calculate total operating cycle counts, calculated for each individual program of the plurality of programs, until the completion time, through dividing the completion time by each of the individual operating cycles; and
 a processor configured to execute the plurality of programs that are allocated to the respective operating cycles within the plurality of base periods.

2. A scheduling device comprising:
 a scheduler configured to
  calculate, as a unit time, the greatest common denominator of individual operating cycles of a plurality of programs;
  allocate the individual operating cycles of the plurality of programs into each of a plurality of continuous base periods that each has the unit times, in sequence beginning with the shortest operating cycle;
  allocate the operating cycles of remaining programs for which the operations have not been completed during one of the plurality of base periods into remaining base periods, in sequence beginning with the shortest operating cycles;
  wherein the scheduler is further configured to calculate, as the completion time required for completing at least one cycle of all of the operations of a plurality of programs, the least common multiple of the operating cycles of the plurality of programs; and
  wherein the scheduler is further configured to calculate total operating cycle counts, calculated for each individual program of the plurality of programs, until the completion time, through dividing the completion time by each of the individual operating cycles.

3. The scheduling device of claim 2, wherein completion time is the total time of a plurality of continuous base periods.

4. The scheduling device of claim 2, wherein the allocating unit allocates individual operating times for the plurality of programs into a plurality of base periods until the operating cycle count for each of the plurality of programs reaches the total number operating cycle count.

5. The scheduling of claim 2, wherein the scheduler is further configured to allocate a timing specifying program which is required to be executed at specified timing, into at least one of the plurality of continuous base periods prior to the allocation, of the individual operating times of the respective programs which are not timing specifying programs into each of the plurality of continuous base periods.

6. A scheduling method comprising:
 calculating, by a scheduler, as a unit time, the greatest common denominator of individual operating cycles of a plurality of programs via a unit time calculating unit;
 allocating, by the scheduler, individual operating cycles of the plurality of programs into each of a plurality of continuous base periods that each has the unit times, in sequence beginning with the shortest operating cycles;
 allocating, by the scheduler, the operating cycles of remaining programs for which the operations have not been completed during one of the plurality of base periods into remaining base, in sequence beginning with the shortest operating cycles;

calculating, by the scheduler, as the completion time required for completing at least one cycle of all of the operations of a plurality of programs, the least common multiple of the operating cycles of the plurality of programs; and calculating, by the scheduler, total operating cycle counts, calculated for each individual program of the plurality of programs, until the completion time, through dividing the completion time by each of the individual operating cycles.

7. The scheduling method of claim 6, wherein the total time of a plurality of continuous base periods is the completion time.

8. The scheduling method of claim 6, wherein, in the allocation, individual operating cycles for the plurality of programs are allocated into a plurality of base periods until the operating cycle count for each of the plurality of programs reaches the total number operating cycle count.

9. The scheduling method of claim 6, further comprising:
allocating a timing specifying program which is required to be executed at specified timing into at least one of the plurality of continuous base periods prior to the allocation of the individual operating cycles of the respective programs which are not timing specifying programs into each of the plurality of continuous base periods.

* * * * *